(12) United States Patent
Zheng et al.

(10) Patent No.: US 6,870,707 B1
(45) Date of Patent: Mar. 22, 2005

(54) DISC HEAD SLIDER HAVING VERTICALLY CONTOURED FEATURES AND METHOD OF FABRICATING VERTICALLY CONTOURED FEATURES ON A SLIDER

(75) Inventors: Lanshi Zheng, Eden Prairie, MN (US); Lance E. Stover, Eden Prairie, MN (US); Jianxin Zhu, Eagan, MN (US); Weimin Qian, Bloomington, MN (US); Lowell J. Berg, Eden Prairie, MN (US); Moshe Olim, Eden Prairie, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 741 days.

(21) Appl. No.: 09/757,446

(22) Filed: Jan. 9, 2001

Related U.S. Application Data
(60) Provisional application No. 60/209,015, filed on Jun. 1, 2000, and provisional application No. 60/200,518, filed on Apr. 27, 2000.

(51) Int. Cl.[7] .......................... G11B 5/60; G11B 17/32; G11B 15/64
(52) U.S. Cl. .................................................. 360/235.6
(58) Field of Search .......................... 360/235.6, 235.7, 360/235.9, 236.3, 236.1; 29/603.07; 430/947, 949, 312, 313, 322, 5

(56) References Cited

U.S. PATENT DOCUMENTS

| | | | |
|---|---|---|---|
| 4,567,104 A | 1/1986 | Wu | 428/410 |
| 4,670,366 A | 6/1987 | Wu | 430/13 |
| 4,894,303 A | 1/1990 | Wu | 430/13 |
| 4,938,841 A * | 7/1990 | Shahar et al. | 430/313 |
| 4,939,603 A | 7/1990 | Inumochi | 360/103 |
| 5,078,771 A | 1/1992 | Wu | 65/30.11 |
| 5,200,868 A | 4/1993 | Chapin et al. | 360/103 |
| 5,285,517 A | 2/1994 | Wu | 385/142 |
| 5,329,689 A | 7/1994 | Azuma et al. | 29/603 |
| 5,404,256 A | 4/1995 | White | 360/103 |
| 5,490,026 A | 2/1996 | Dorius et al. | 360/103 |
| 5,568,981 A | 10/1996 | Nepela et al. | 384/12 |
| 5,606,476 A | 2/1997 | Chang et al. | 360/103 |
| 5,704,715 A | 1/1998 | Chang et al. | 384/12 |
| 5,754,367 A | 5/1998 | Chang et al. | 360/103 |
| 5,777,825 A | 7/1998 | Dorius | 360/103 |
| 5,851,701 A * | 12/1998 | Rolson | 430/5 |
| 5,853,959 A | 12/1998 | Brand et al. | 430/320 |
| 5,925,261 A | 7/1999 | Burbank | 216/22 |
| 5,928,813 A | 7/1999 | Krivokapic et al. | 430/5 |
| 5,939,227 A | 8/1999 | Smith | 430/5 |
| 6,033,766 A * | 3/2000 | Block et al. | 430/5 |
| 6,107,000 A | 8/2000 | Lee et al. | 430/296 |
| 6,534,221 B2 * | 3/2003 | Lee et al. | 430/5 |

FOREIGN PATENT DOCUMENTS

EP      0 129 336 A1     12/1984

OTHER PUBLICATIONS

Product data sheet, Canyon Materials, Inc., "LDW–Glass Photomask Blanks", pp. 1–4; undated.

\* cited by examiner

*Primary Examiner*—George Letscher
*Assistant Examiner*—Christopher R. Magee
(74) *Attorney, Agent, or Firm*—Westman, Champlin & Kelly (57) ABSTRACT

A method of contouring a surface of a slider for supporting a transducer relative to a data storage medium includes applying a lithographic resist layer to the slider surface. The resist layer is then exposed through a single mask having 3a mask pattern defined by variation in an optical density through the mask. The resist layer is exposed in an exposure pattern corresponding to the mask pattern. Portions of the resist layer are removed as a function of the exposure pattern to produce a vertically contoured resist layer. The slider surface is etched through the vertically contoured resist layer during a single etching step to form a vertically contoured surface feature within the slider surface.

13 Claims, 4 Drawing Sheets

DISC HEAD SLIDER HAVING VERTICALLY CONTOURED FEATURES AND METHOD OF FABRICATING VERTICALLY CONTOURED FEATURES ON A SLIDER

CROSS-REFERENCE TO RELATED APPLICATIONS

This application claims the benefit of U.S. Provisional Applications 60/200,518, which is entitled "AIR BEARING SLIDER WITH ETCHED TAPER RAILS" and was filed Apr. 27, 2000, and 60/209,015, which is entitled "SINGLE-PASS SLIDER AIR BEARING SURFACE FABRICATION" and was filed Jun. 1, 2000.

BACKGROUND OF THE INVENTION

The present invention relates to disc drive data storage systems and, more particularly, to fabricating a disc head slider with vertically contoured surface features through a single lithographic mask and etching step.

Disc drives are well known in the industry. Such drives use rigid discs, which are coated with a magnetizable medium for storage of digital information in a plurality of circular, concentric data tracks. The discs are mounted on a spindle motor, which causes the discs to spin and the surfaces of the discs to pass under respective hydrodynamic (e.g. air) bearing disc head sliders. The sliders carry transducers, which write information to and read information from the disc surfaces.

An actuator mechanism moves the sliders from track-to-track across the surfaces of the discs under control of electronic circuitry. The actuator mechanism includes a track accessing arm and a suspension for each disc head slider. The suspension includes a load beam and a gimbal. The load beam provides a load force which forces the slider toward the disc surface. The gimbal is positioned between the slider and the load beam, or is integrated in the load beam, to provide a resilient connection that allows the slider to pitch and roll while following the topography of the disc.

The slider includes a hydrodynamic (e.g. air) bearing surface, which faces the disc surface. As the disc rotates, the disc drags air under the slider and along the bearing surface in a direction approximately parallel to the tangential velocity of the disc. As the air passes beneath the bearing surface, air compression along the air flow path causes the air pressure between the disc and the bearing surface to increase, which creates a hydrodynamic lifting force that counteracts the load force and causes the slider fly above or in close proximity to the disc surface. It is desirable to maintain a substantially constant flying height and provide minimal tribological problems between the bearing surface and the disc surface.

A conventional catamaran slider includes a pair of raised side rails which face the disc surface and form the air bearing surfaces. The raised side rails are separated by an etched cavity and have tapered or stepped leading edges. Additional stepped surfaces have also be formed at various other locations on the slider surface, which are recessed slightly from the bearing surfaces. These surface features are typically formed-with the cavity through a photolithography process. A traditional photolithography process uses binary photo masks with hard edges to create well-defined patterns in a photoresist layer that is applied to the slider surface. The photoresist pattern is then transferred to the slider surface through an etching or ion milling process.

A traditional photolithography process has certain limits on the types of features that can be patterned and lacks flexibility in shaping the transition geometry between different vertical levels on the bearing surface. A traditional photolithography process can produce only two-dimensional features in the horizontal, x-y dimension with each mask and resist pattern. It cannot directly produce a linear or non-linear profile in the vertical, z-dimension on the slider surface. In addition, a traditional photolithography process requires multiple photo/etching process steps in order to produce features having multiple depths. This decreases the throughput of the fabrication process and increases fabrication costs and cycle time. Also, a multiple-step photolithography process has difficulty in achieving tight process tolerance control since error can be introduced with each mask alignment.

There is a thus continuing need for improved fabrication processes of vertically contoured slider surface features which can be used to improve performance of the slider or read/write head.

SUMMARY OF THE INVENTION

One aspect of the present invention relates to a method of contouring a surface of a slider for supporting a transducer relative to a data storage medium. The method includes applying a lithographic resist layer to the slider surface. The resist layer is then exposed through a single mask having a mask pattern defined by variation in an optical density through the mask. The resist layer is exposed in an exposure pattern corresponding to the mask pattern. Portions of the resist layer are removed as a function of the exposure pattern to produce a vertically contoured resist layer. The slider surface is etched through the vertically contoured resist layer during a single etching step to form a vertically contoured surface feature within the slider surface.

Another aspect of the present invention relates to a lithographic mask for exposing a resist layer on a disc head slider. The mask has a mask pattern including a central recess defining area, which has a first optical density. First and second rail defining areas are disposed about the central recess defining area and have respective leading edges and a second optical density that is different than the first optical density. A leading taper defining area is positioned along the leading edges of the first and second rail defining areas, which has a third optical density that is between the first and second optical densities and progressively increases or decreases in a direction from the leading edges toward a leading edge of the mask pattern that corresponds to a leading edge of the slider.

Another aspect of the present invention relates to a slider for supporting a transducer relative a data storage medium. The slider includes a slider body having a disc-facing surface with a leading slider edge and a trailing slider edge. First, second and third rails are positioned on the disc facing surface and each have a leading rail edge. The first and second rails are disposed about a central recess, and the third rail is positioned laterally between the first and second rails, rearward of the central recess relative to the leading and trailing slider edges. The first, second and third rails form first, second and third bearing surfaces, respectively. First, second and third leading tapered surfaces are positioned along the leading rail edges of the first, second and third rails, respectively, and are oriented with respect to the first, second and third bearing surfaces at angles between 0.2 to 0.5 degrees.

Yet another aspect of the present invention relates to a slider fabrication apparatus, which includes a slider having a bearing surface with a resist layer formed thereon and a lithographic mask for exposing the resist layer as a function of a pattern defined by an optical density through the lithographic mask. The lithographic mask creates a progressively increasing or decreasing exposure level along at least one portion of the resist layer.

DETAILED DESCRIPTION OF ILLUSTRATIVE EMBODIMENTS

Figure 1:
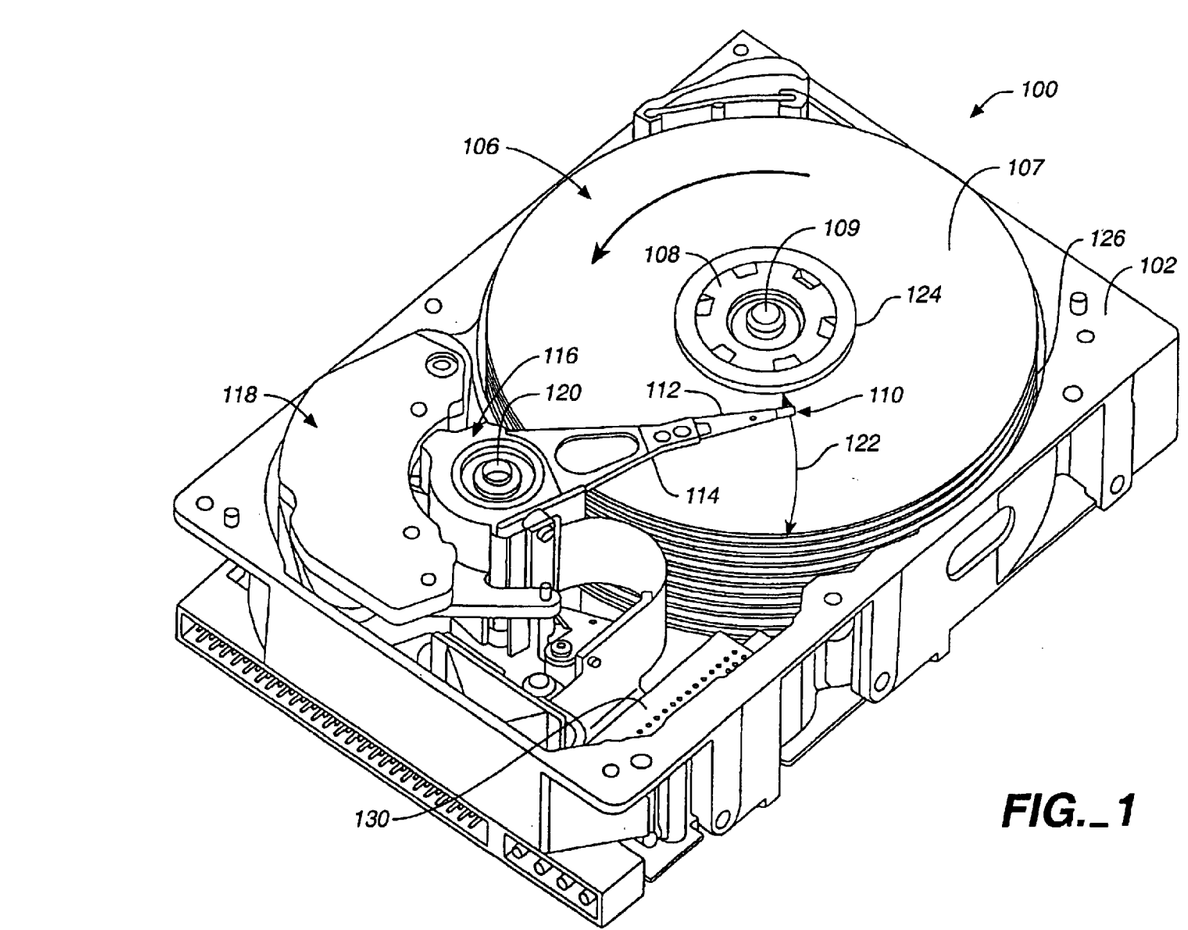
FIG. 1 is a perspective view of a disc drive in which the present invention is useful.

FIG. 1 is a perspective view of a disc drive 100 in which the present invention is useful. Disc drive 100 can be configured as a magnetic disc drive, a magneto-optical disc drive or an optical disc drive, for example. Disc drive 100 includes a housing with a base 102 and a top cover (not shown). Disc drive 100 further includes a disc pack 106, which is mounted on a spindle motor (not shown) by a disc clamp 108. Disc pack 106 includes a plurality of individual discs 107, which are mounted for co-rotation about central axis 109. Each disc surface has an associated slider 110 which is mounted to disc drive 100 and carries a read/write head for communication with the disc surface.

In the example shown in FIG. 1, sliders 110 are supported by suspensions 112 which are in turn attached to track accessing arms 114 of an actuator 116. The actuator shown in FIG. 1 is of the type known as a rotary moving coil actuator and includes a voice coil motor (VCM), shown generally at 118. Voice coil motor 118 rotates actuator 116 with its attached sliders 110 about a pivot shaft 120 to position sliders 110 over a desired data track along a path 122 between a disc inner diameter 124 and a disc outer diameter 126. Voice coil motor 118 operates under control of internal circuitry 130. Other types of actuators can also be used, such as linear actuators.

Figure 2:
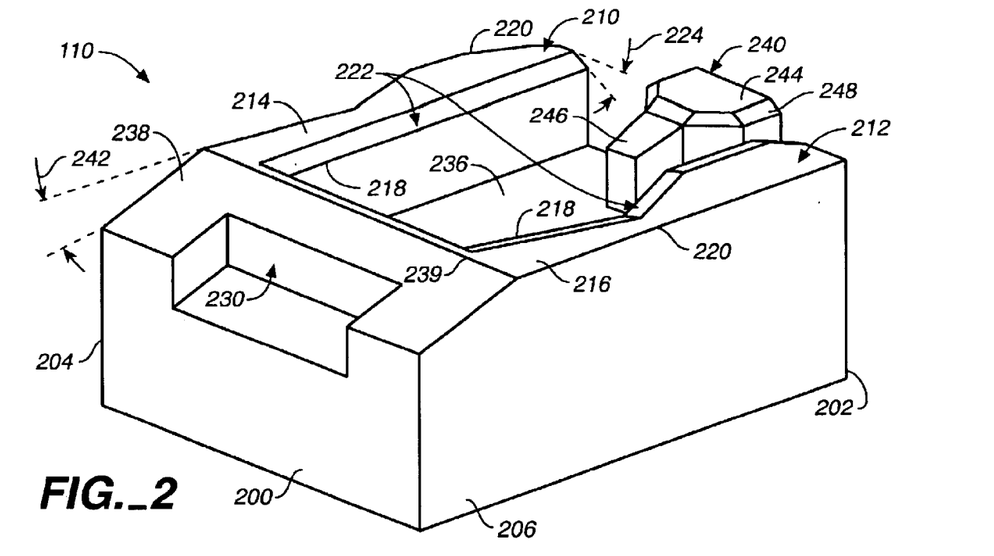
FIG. 2 is a bottom, perspective view of a slider shown in FIG. 1, as viewed from the surface of a disc, according to one embodiment of the present invention.

FIG. 2 is a bottom, perspective view of one of the sliders 110 of FIG. 1, as viewed from the surface of disc 107 according to one embodiment of the present invention. The vertical dimensions of slider 110 are greatly exaggerated in FIG. 2 for clarity. Slider 110 has a leading edge 200, a tailing edge 202 and side edges 204 and 206. Elongated, raised side rails 210 and 212 are positioned along side edges 204 and 206, respectively, and form bearing surfaces 214 and 216, respectively. Rails 210 and 212 extend from leading slider edge 200 to trailing slider edge 202. In an alternative embodiment, side rails 210 and 212 terminate prior to trailing slider edge 202. Each rail 210 and 212 has an inside rail edge 218 and an outside rail edge 220. An etched taper surface 222 is formed along inside edges 218, which can extend along the entire inside edge or along only a portion of the inside edge.

A cavity dam 230 extends between rails 210 and 212 near leading slider edge 200. Cavity dam 230 and side rails 210 and 212 together define a subambient pressure cavity (or "central recess") 236, which trails cavity dam 230 relative to a direction of air flow from the leading slider edge 200 toward trailing slider edge 202. A leading taper surface 238 is formed along the leading edges of side rails 210 and 212 and cavity dam 230. In the embodiment shown in FIG. 2, leading taper surface 238 extends from leading edge 200 to an intersection 239 with bearing surfaces 214 and 216. A raised center pad or rail 240 is positioned along trailing slider edge 202 and is centered along a lateral center line of slider 110. In alternative embodiments, center pad 240 can be skewed or offset with respect to the lateral center line. Center pad 240 has a bearing surface 244, a leading taper surface 246 and side taper surfaces 248.

During operation, as disc 107 (shown in FIG. 1) drags air beneath slider 110, leading taper surface 238 provides an initial increase in pressure between slider 110 and the disc surface and affects the overall pressure distribution along the rest of the bearing surfaces. A large pressure gradient along leading taper surface 238 reduces the speed at which slider 110 takes off from the disc surface. However, the take-off speed is highly sensitive to the angle and length of leading taper surface 238 and the location of intersection 239. Therefore, these parameters must be tightly controlled. Leading tapers have traditionally been formed by angled lapping processes in which tolerances were difficult to control. More recently, these leading tapers were replaced by leading "step" surfaces, which were recessed slightly from the bearing surfaces and approximated a leading taper. These leading step surfaces could be accurately fabricated with an etching or ion milling process. Depending on the geometry of the bearing surfaces, the step surfaces and the deeper central recess may require the use of multiple lithographic mask and etching steps.

In contrast, leading taper surface 238 is a true three-dimensional vertically-contoured surface feature that is formed with the other bearing features, including taper surfaces 222, 246 and 248 by a fabrication process having a single lithographic mask, as described in more detail below. Since an etching process is used, the dimensions and location of leading taper surface 238 can be tightly controlled. Also, the fabrication process described below can be used to fabricate a variety of different taper profiles and can achieve extremely shallow taper angles. In one embodiment, leading taper 238 is oriented relative to bearing surfaces 214 and 216 at an average angle 242 of 0.2 degrees to 0.5 degrees, for example. Other angles can also be formed, including angles less than 1.0 degrees. Leading taper surface 238 extends along about 10 percent to 20 percent of the length of slider 110, as measured from leading edge 200 to trailing edge 202. In one embodiment, leading taper surface 238 is 100 microns to 300 microns long. Leading taper 238 can be linear or curved, for example.

With the pressure increase provided by leading taper surface 238, bearing surfaces 214 and 216 become pressurized quickly, while air flowing under cavity dam 230 expands as the air reaches central recess 236. The pressure within central cavity 236 can become subambient. Due to the sudden lateral pressure gradient between central recess 236 and bearing surfaces 214 and 216, air flow can become stagnant along the inside edges 218 of side rails 212 and 214. Stagnant flow has been found to accumulate lubricant and debris, which can adversely increase stiction between the slider and disc surfaces. Etched tapers 222 limit collection of lubrication and debris by providing a controlled pressure gradient between central recess 236 and the inside edges 218 of side rails 210 and 212. By controlling the pressure gradient in these areas, stagnant flow can be reduced or controlled in a desired manner. In one embodiment, etched tapers 222 form an average angle 224 of 0.2 degrees to 45 degrees with bearing surfaces 216 and 216, but can have other angles in alternative embodiments.

On center rail 240, leading taper surface 246 provides pressurization of bearing surface 244 from air flow venting from central recess 236. Leading taper surface 246 is designed to provide a desired pressure gradient along bearing surface 244. A large pressurization gradient along bearing surface 244 assists slider 110 in taking off from the disc surface and reduces sensitivity of the slider's flying height on changes in altitude. Since the take-off speed and altitude sensitivity are highly sensitive to the taper angle, the ability to fabricate taper surface 246 accurately through a one-step masking and etching process can reduce variations in these parameters to improve slider performance. Tapered surface 246 allows slider 110 to have both a low take-off velocity and a low altitude sensitivity. In one embodiment, leading taper surface 246 has an average angle of about 0.2 degrees to about 1.0 degrees with respect to bearing surface 244. Other ranges an also be used, such as between 0.2 degrees and 0.5 degrees or less than 0.2 degrees.

Similar to taper surfaces 222, taper surfaces 248 along the sides of center rail 240 limit areas of stagnant flow between center rail 240 and recessed area 236. Taper surfaces 248 can have average angles of about 0.2 degrees to about 45 degrees, for example, with respect to bearing surface 244.

A numerical model was used to compare the performance of three different types of sliders. The first slider had a geometry similar to slider shown in FIG. 2 with a small taper angle along the leading edge of the center rail. The second, slider had a geometry similar to slider shown in FIG. 2 but with a large taper angle along the leading edge of the center rail. The third slider had similar features as slider 110, but with stepped leading edges as opposed to tapered leading edges. Table 1 lists the maximum fly height ("FH") loss between sea level and an altitude of 10,000 feet and the corresponding take-off speed for each slider. These values were obtained for a typical 3.5 inch disc drive operated at 7,200 revolutions per minute (RPM).

TABLE 1

| Slider Type | Max. FH Loss for 10 kft. Altitude | Takeoff Speed |
| --- | --- | --- |
| Slider 110 with tapered rails (small taper angle in center rail) | 12.4% of gap fly height | 65% of full RPM |
| Slider 110 with tapered rails (large taper angle in center rail) | 15.9% of gap fly height | 33% of full RPM |
| Slider with stepped rails | 23% of gap fly height | 66% of full RPM |

Table 1 demonstrates that slider 110 which has tapered rails, achieves a lower take-off velocity and has less fly height sensitivity to altitude than the slider having stepped leading edges. Table 1 also shows that the taper angle along the leading edge of the center rail plays an important roll for take-off and altitude sensitivity. Thus, the ability to control the dimensions and location of each taper through a single-pass lithography process is significant.

Figure 3A:
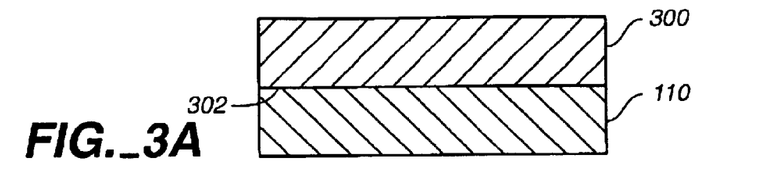
FIGS. 3A–3E are cross-sectional views of the slider shown in FIG. 2, which schematically illustrate processing steps performed on the slider according to one embodiment of the present invention.

FIGS. 3A–3E are cross-sectional views of slider 110, which schematically illustrate steps for fabricating slider 110 with a single lithographic mask, according to one embodiment of the present invention. While the embodiment shown in FIGS. 3A–3E are directed to the use of a photolithographic mask, other types of lithographic processes can also be used, such electron beam and x-ray lithography processes. The dimensions shown in FIGS. 3A–3E are greatly exaggerated for clarity. In FIG. 3A, a positive photolithography resist ("photoresist") layer 300 is applied to surface 302 of slider 110. A variety of photoresist materials can be used, such as a diazonapththoquinone sulfonic ester, which is sold under the name NOVOLAK. An alternative embodiment, a negative resist is used.

Figure 3B:
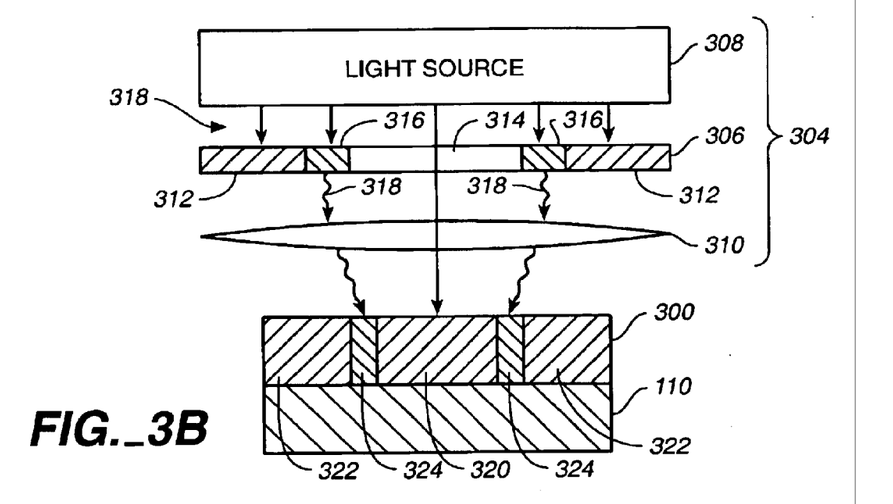

In FIG. 3B, an imaging apparatus 304 exposes photoresist layer 300 through a photolithography mask 306. Imaging apparatus 304 includes a light source 308, and a lens 310. Mask 306 has a plurality of masked and unmasked areas which are arranged in a desired pattern for exposing photoresist layer 300. For example, mask 306 includes masked areas 312 and unmasked area 314, which can correspond to bearing surfaces 214 and 216 and central recess 236 (shown in FIG. 2), respectively. Light 318 generated by light source 308 is blocked or otherwise attenuated by masked areas 312 and passes through unmasked area 314. Lens 310 focuses light 318 passing through mask 306 onto photoresist layer 300 and thereby projects the desired exposure pattern onto photoresist layer 300. Light 318 exposes portion 320 of photoresist layer 300, which corresponds to unmasked area 314, while portions 322 remain unexposed. Exposing portions 320 to light 318 induces a chemical change in the positive photoresist material which causes the portions to be susceptible to etching, as is well known in the art. Unexposed portions 322 resist etching.

According to one embodiment of the present invention, mask 306 is a "gray-scale" mask in which the mask pattern is defined entirely by the optical density through the mask. Thus, masked areas 312 have a greater optical density than unmasked areas 314. Mask 306 further includes intermediate areas 316, which are positioned masked areas 312 and unmasked area 314 and have an optical density that is between the optical densities of masked areas 312 and unmasked area 314. These intermediate areas 316 are used to modulate the illumination field provided by light 318 during exposure of photoresist layer 300.

In one embodiment, the optical densities of intermediate areas 316 progressively decreases from masked areas 312 toward unmasked area 314. With a negative photoresist, the optical densities of intermediate areas 316 would progressively increase from masked areas 312 toward unmasked area 314. The optical density of mask 306 can vary along intermediate areas 316 in a linear fashion or in a non-linear fashion. The optical density can vary continuously or in successive increments along intermediate areas 316, and can vary in any pattern.

A variety of technologies can be used to create mask 306 with a varying optical density. For example, one technology is referred to as "High Energy Beam Sensitivity" (HEBS) and is described in U.S. Pat. No. 5,285,517. With this technology, an electronic beam is scanned along the mask substrate to induce a chemical change in the mask that changes the light transmission levels (or optical density) through the mask in a desired pattern. Another technology is referred to as "Laser Direct Write" (LDW). The LDW process is similar to the HEBS process, but a laser is used to change the optical density of the mask substrate instead of an electronic beam. In an "Attenuating Phase Shift Mask" (APSM), as described in U.S. Pat. Nos. 5,928,813 and 5,939,227, for example, the optical density of the, mask is varied by varying the thickness of the mask in certain areas or by the use of different material in different areas of the mask. Other technologies can also be used.

With mask 306, the light passing through intermediate areas 316 becomes modulated by the varying optical densities along the intermediate areas, as represented by wavy lines 318. As a result, intermediate portions 324 of photoresist layer 300 are only partially exposed, and the exposure level (i.e. depth) in these portions increases (or-decreases for a negative photoresist) from unexposed portions 322 toward exposed portion 320.

Figure 3C:
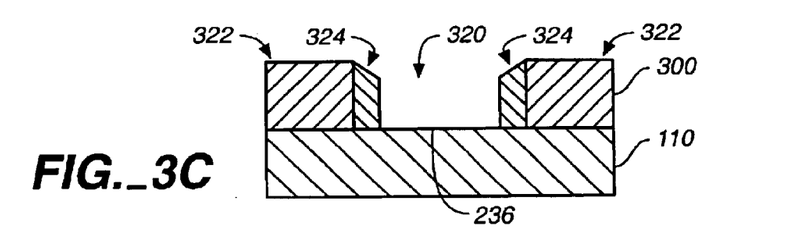

In FIG. 3C, photoresist layer 300 is removed through a chemical dissolution process as a function of the level of exposure to form a patterned photoresist. With a positive photoresist, fully exposed portion 320 is completely or substantially stripped from the surface of slider 110. Unexposed portions 322 remain on the slider surface, and partially exposed portions 324 are partially stripped. The modulated exposure level in intermediate portions 324 provides vertically contoured, sloping side walls between the stripped and unstripped resist portions. The angle and length of the contour can be varied by varying the rate at which the optical density changes in mask 306 and the length of intermediate mask portions 316.

Figure 3D:
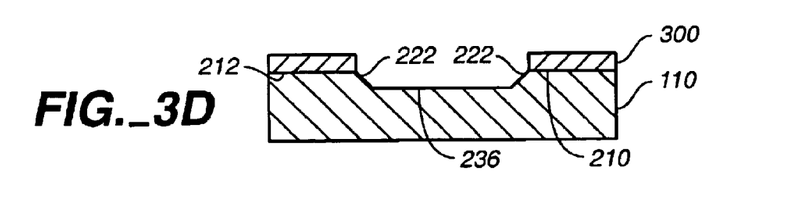
Figure 3E:
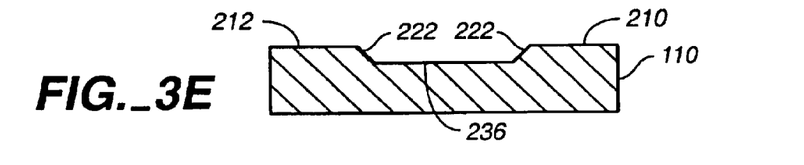

In FIG. 3D, the unstripped portions of the patterned photoresist layer 300 and the uncovered portions of the slider surface are etched to transfer the exposure pattern to the slider surface. Etching can include various types of etching, such as reactive or non-reactive ion milling, for example. In this example, the exposure pattern forms side rails 310 and 312, central recess 236 and tapered surfaces 222 within the surface of slider 110. The vertically sloping contours of partially stripped photoresist portions 324 create smooth, sloped transitions along the inside edges of side rails 210 and 212, as shown in FIG. 2. The other features of slider 110, including cavity dam 230, leading taper 238, center pad 240 and tapered surfaces 246 and 248 are also formed during the etching step shown in FIG. 3D. After etching, a small portion of photoresist layer 300 remains on the slider surface. In FIG. 3E, the remaining portions of photoresist layer 300 are removed, leaving the desired pattern in slider 110.

Figures 4A, 4B:
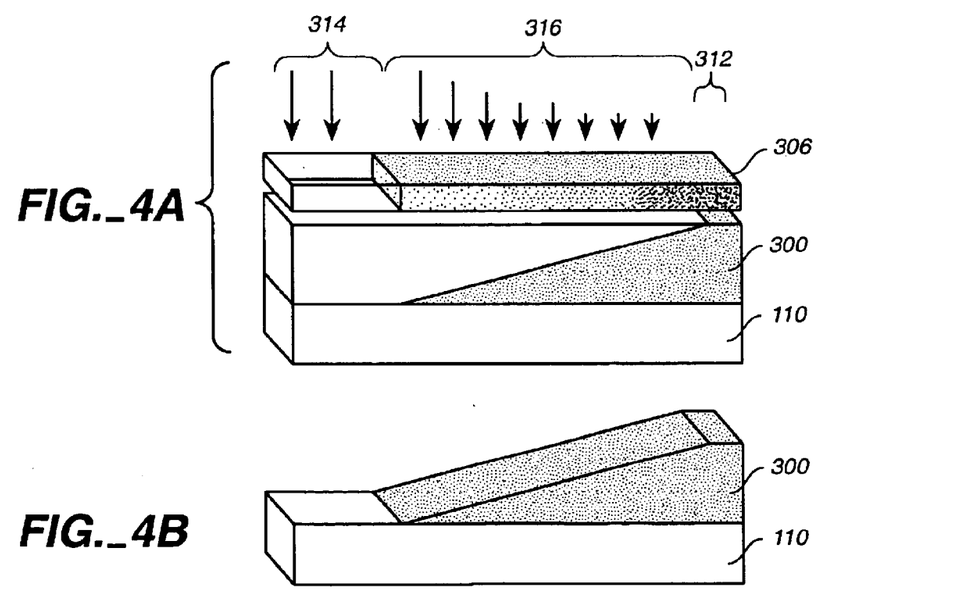
FIGS. 4A–4C are perspective, fragmentary views of a portion of the slider, which illustrate the modulated exposure and development process in greater detail.
Figure 4C:
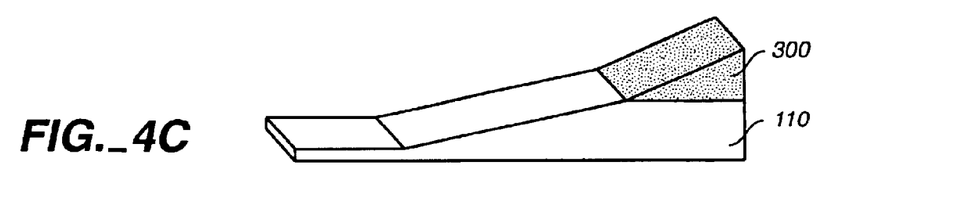

FIGS. 4A–4C are perspective, fragmentary views of a portion of slider 110 (along side rail 212), which illustrate the modulated exposure and development process in greater detail. In FIG. 4A, slider 110 is shown with photoresist layer 300 positioned relative to gray-scale mask 306. Areas 312, 314 and 316 represent areas in mask 300 having different optical densities. In addition, the optical density in area 316 decreases from left to right in the figure. Lines 318 represent light passing through mask 300, wherein the length of each line represents the light transmission levels through mask 306. As the optical density of mask 404 decreases from the right-to-left, the light transmission level increases. As a result, photoresist layer 300 has a varying exposure level, wherein portions of the photoresist layer on the left-hand side of mask 300 are exposed more deeply than portions on the right-hand side of the mask.

FIG. 4B illustrates photoresist layer 402 after the mask has been developed. After developing, a three-dimensional air bearing surface pattern has been transferred into photoresist layer 300. Photoresist layer 300 now contains all of the information from the gray-scale mask 306. The angled division line within photoresist layer 300 in FIG. 4B represents the varying exposure level. In FIG. 4C, after a controlled etching process, the three-dimensional air bearing surface pattern is transferred into the slider substrate 110.

Figure 5:
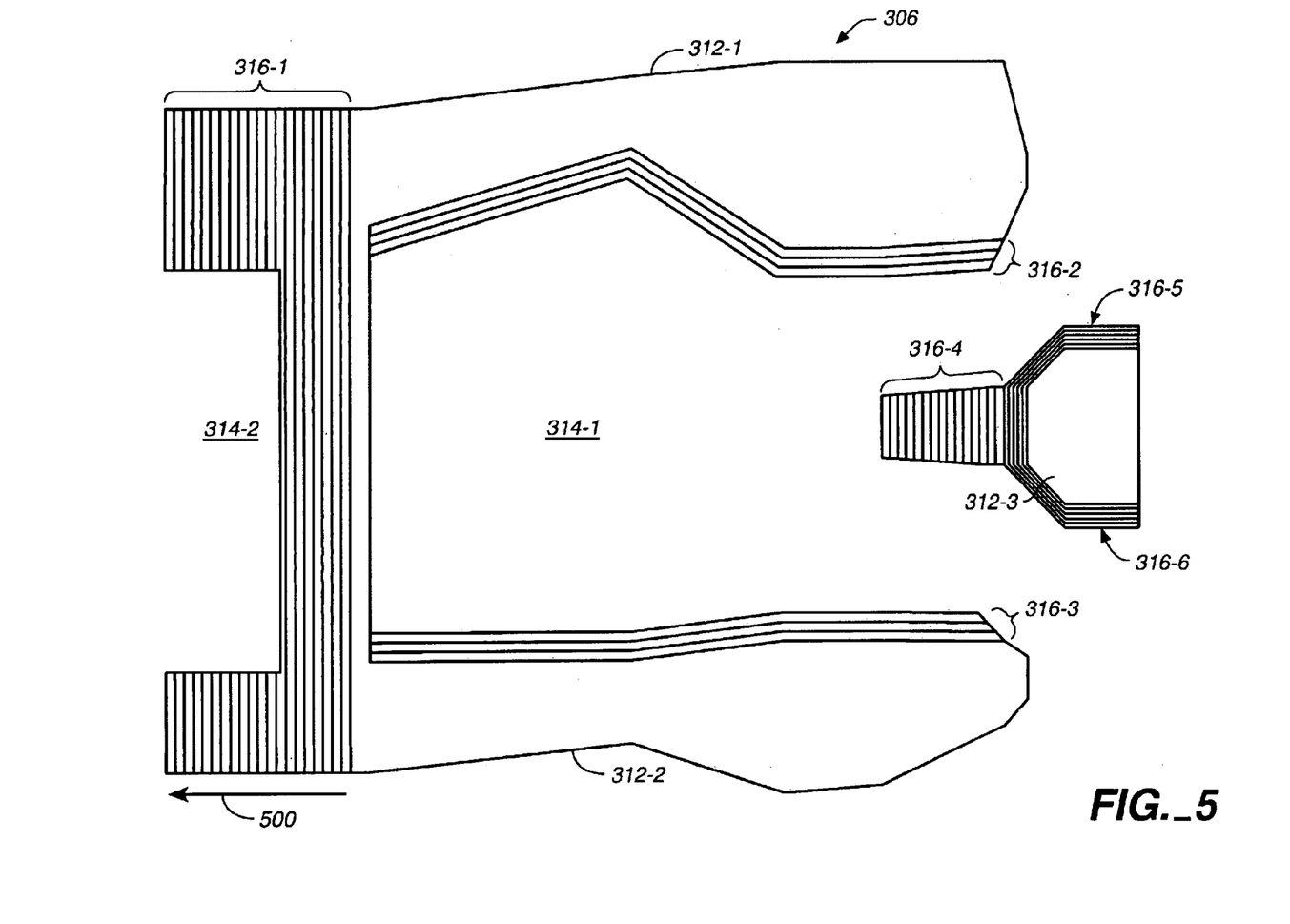
FIG. 5 is a plan view of a gray-scale mask used in the fabrication processes shown in FIGS. 3 and 4 according to one embodiment of the present invention.

FIG. 5 is a plan view of gray-scale mask 306 according to one embodiment of the present invention. Mask 306 includes "masked" areas 312-1, 312-2 and 312-3, "unmasked" areas 314-1 and 314-2 and intermediate, "gray-scale" areas 316-1 to 316-6. Masked areas 312-1, 312-2 and 312-3 define the bearing surfaces of side rails 210 and 212, cavity dam 230 and center rail 240 when transferred to the surface of slider 110. Unmasked area 314-1 defines the shape of central recess 236 of slider 110, while unmasked area 314-2 defines the shape of leading taper surface 238 and the leading edge of cavity dam 230. Intermediate areas 316-1 to 316-6 define the length and vertical contour of tapered surfaces 238, 222, 246 and 248 of slider 110. Other mask patterns can also be used.

The lines within intermediate gray-scale areas 316-1 to 316-6 represent separation between areas of different optical density. For example, leading taper surface 238 (shown in FIG. 2) is defined by progressively decreasing the optical density of mask 306 along area 316-1 in the direction of arrow 500. For a negative photoresist, the optical density would increase in the direction of arrow 500. The optical density can be graduated, stepped or continuously varied in a manner that is chosen to provide the desired vertical contour. For example, the optical density can vary linearly or non-linearly. A non-linear change in the optical density can be used to create a curved taper. Also, the width of each optical density gradient can be varied as desired, and each gradient line can be straight or curved.

In one embodiment, mask 306 has 40 different gray-levels, which correspond to 40 different light transmission levels (or optical densities) at certain wavelengths between 300 nm to 500 nm in the ultraviolet spectrum. The gray-levels are identified by optical density numbers. In order to determine the correct optical densities for creating the desired profile in slider 110, a characterization curve is used to correlate the optical density values to final coordinates in the Z-direction, normal to the surface of slider 110. For an HEBS mask, these optical density values are obtained in the desired areas by controlling the energy of the electronic beam used during mask fabrication.

By selecting an appropriate mask pattern, the optical density of the mask can be varied to fabricate a vertically contoured surface feature at any location on the slider surface. It has been found that mask 306 can be used generate surfaces having extremely small taper angles over a fairly long surface. Slopes of less than 1 degree have been difficult to fabricate accurately with other etching processes. Thus, the air bearing surface of a recording head can be fabricated to define any true three-dimensional geometry in a single-pass process. Any multiple-level, three-dimensional feature can be formed. This technique can therefore be used to design an air bearing having low altitude sensitivity without sacrificing take-off performance by more effective use of tapers. Also, with only a single imaging pass, fly height variation due to misalignment of the mask is reduced as compared to processes requiring multiple masks.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the disc head slider while maintaining substantially the same functionality without departing from the scope and spirit of the present invention. In addition, although the slider example described is a negative pressure slider, it will be appreciated by those skilled in the art that the teachings of the present invention can be applied to other types of sliders, such as positive pressure slider having no cavity dam and sliders having different numbers of rails and rail shapes without departing from the scope and spirit of the present invention. Also, the present invention can be used with any type of transducing head such as magnetic, magneto-resistive, optical or magneto-optical heads, for example.

What is claimed is:

1. A method of contouring a surface of a slider for supporting a transducer relative to a data storage medium, the method comprising:

(a) applying a lithographic resist layer to the slider surface;

(b) exposing the resist layer through a single mask having a mask pattern defined by variation in an optical density through the mask, wherein the mask pattern comprises a masked portion having a first optical density, an unmasked portion having a second optical density that is lower than the first optical density and an intermediate portion positioned between the masked and unmasked portions and having a third optical density that is between the first and second optical densities, and wherein the resist layer is exposed in an exposure pattern corresponding to the mask pattern;

(c) removing portions of the resist layer as a function of the exposure pattern to produce a vertically contoured resist layer; and (d) etching the slider surface through the vertically contoured resist layer during a single etching step to form a vertically contoured surface feature within the slider surface.

2. The method of claim 1 wherein, in step (b), the third optical density varies linearly along the intermediate portion such that the resist layer is exposed to a depth that varies linearly along a portion of the resist layer that corresponds to the intermediate portion of the mask.

3. The method of claim 1 wherein, in step (b), the third optical density varies non-linearly along the intermediate portion such that the exposure pattern varies non-linearly along a portion of the resist layer that corresponds to the intermediate portion of the mask.

4. The method of claim 1 wherein, in step (b), the mask pattern comprises:

a central recess defining area having a first optical density;

first and second rail defining areas which have a second optical density that is different than the first optical density, are disposed about the central recess defining area and have respective leading edges; and a leading taper defining area positioned along the leading edges of the first and second rail defining areas, which has a third optical density that is between the first and second optical densities and progressively increases or decreases in a direction from the leading edges toward a leading edge of the mask pattern that corresponds to a leading edge of the slider.

5. The method of claim 4 wherein the third optical density progressively varies such that the etching step (d) forms a vertically contoured leading taper surface in the slider along leading edges of first and second side rails formed in the slider and corresponding to the first and second rail defining areas of the mask and wherein the leading taper surface has an angle of 0.2 degrees to 0.5 degrees relative to the first and second side rails.

6. The method of claim 1 wherein, in step (b), the mask pattern comprises:

a central recess defining area having a first optical density;

first and second rail defining areas which have a second optical density that is different than the first optical density, are disposed about the central recess defining area and have respective inside edges along the central recess defining area; and first and second edge taper defining areas positioned along the inside edges of the first and second rail defining areas, respectively, which have a third optical density that is between the first and second optical densities and progressively increases or decreases in a direction from the inside edges toward the central recess defining area.

7. The method of claim 6 wherein the third optical density progressively varies such that the etching step (d) forms first and second vertically contoured edge taper surfaces in the slider along inside edges of opposing first and second side rails formed in the slider and corresponding to the first and second rail defining areas of the mask and wherein the first and second edge taper surfaces have angles of 0.2 degrees to 45 degrees relative to the first and second side rails.

8. The method of claim 1 wherein, in step (b), the mask pattern further comprises:

a central recess defining area having a first optical density;

first and second rail defining areas which are disposed about the central recess defining area and have a second optical density that is different than the first optical density;

a third rail defining area which is positioned between the first and second rail defining areas, has a leading edge that trails a portion of the recessed cavity defining area and has the second optical density; and a leading taper defining area which is positioned along the leading edge of the third rail defining area and has a third optical density that is between the first and second optical densities and progressively increases or decreases in a direction from the leading edge toward the portion of the central recess defining area.

9. The method of claim 8 wherein the third optical density progressively varies such that the etching step (d) forms a vertically contoured leading taper surface in the slider along a leading edge of a center rail formed in the slider and corresponding to the third rail defining area of the mask and wherein the leading taper surface has an angle of 0.2 degrees to 0.5 degrees relative to the center rail.

10. The method of claim 8 wherein, in step (b), the third rail defining area further comprises:

first and second side edges extending along the central recess from the leading edge toward a trailing edge of the third rail defining area; and first and second edge taper defining areas positioned along the first and second side edges, respectively, which have a fourth optical density that is between the first and second optical densities and progressively increases or decreases in a direction from the first and second side edges toward the central recess defining area.

11. The method of claim 10 wherein the third optical density progressively varies such that the etching step (d) forms first and second vertically contoured edge taper surfaces in the slider along side edges of a center rail formed in the slider and corresponding to the third rail defining area of the mask and wherein the first and second edge taper surfaces have angles of 0.2 degrees to 45 degrees relative to the center rail.

12. A disc head slider that is contoured according to the method of claim 1.

13. A slider fabrication apparatus comprising:
a slider having a bearing surface with a resist layer formed thereon; and
lithographic mask means for exposing the resist layer as a function of a pattern defined by an optical density through the lithographic mask means and for creating a progressively varying exposure level along at least one portion of the resist layer, wherein the lithographic mask means comprises a masked portion having a first optical density, an unmasked portion having a second optical density that is lower than the first optical density and an intermediate portion positioned between the masked and unmasked portions and having a third optical density that is between the first and second optical densities.

* * * * *